(12) United States Patent
Liu

(10) Patent No.: US 12,405,401 B2
(45) Date of Patent: Sep. 2, 2025

(54) OPTICAL IMAGING LENS

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 550 days.

(21) Appl. No.: 17/893,193

(22) Filed: Aug. 23, 2022

(65) Prior Publication Data

US 2023/0280497 A1 Sep. 7, 2023

(30) Foreign Application Priority Data

Mar. 4, 2022 (CN) .......................... 202210212731.7

(51) Int. Cl.
*G02B 1/00* (2006.01)
*G02B 9/62* (2006.01)
*G02B 13/00* (2006.01)

(52) U.S. Cl.
CPC ............... *G02B 1/002* (2013.01); *G02B 9/62* (2013.01); *G02B 13/0045* (2013.01)

(58) Field of Classification Search
CPC ........ G02B 9/62; G02B 9/64; G02B 13/0045; G02B 13/0055; G02B 13/0015; G02B 13/16; G02B 13/18; G02B 27/0025; G02B 27/0012; G02B 27/0172; G02B 15/146; G02B 1/002; H04N 5/222; H04N 5/2254

USPC ................. 359/656–358, 713, 749, 756–762
See application file for complete search history.

(56) References Cited

U.S. PATENT DOCUMENTS

| | | | | |
|---|---|---|---|---|
| 2009/0059395 A1* | 3/2009 | Lin | ........................ | G02B 13/22 359/761 |
| 2015/0212296 A1* | 7/2015 | Huang | ............... | G02B 13/0045 359/713 |
| 2016/0306079 A1 | 10/2016 | Arbabi et al. | | |
| 2016/0316180 A1 | 10/2016 | Han et al. | | |
| 2021/0014394 A1* | 1/2021 | Han | ....................... | G02B 5/286 |
| 2021/0247549 A1* | 8/2021 | Park | ....................... | G02B 1/002 |

FOREIGN PATENT DOCUMENTS

| CN | 111007623 A | * | 4/2020 | ......... G02B 13/0045 |
|---|---|---|---|---|
| CN | 112630868 | | 4/2021 | |
| CN | 112748521 | | 5/2021 | |
| CN | 113841076 | | 12/2021 | |

OTHER PUBLICATIONS

Translation of CN111007623 (Year: 2020).*
"Office Action of China Counterpart Application", issued on Mar. 25, 2023, p. 1-p. 5.

\* cited by examiner

*Primary Examiner* — Travis S Fissel
(74) *Attorney, Agent, or Firm* — JCIPRNET

(57) ABSTRACT

An optical imaging lens includes a first lens, a second lens, a third lens, a fourth lens, a fifth lens, and a sixth lens in sequence along an optical axis from an object side to an image side. The first lens to the fifth lens are aspheric surface lenses and have diopters, and the sixth lens is a metalens and has a positive diopter.

14 Claims, 6 Drawing Sheets

OPTICAL IMAGING LENS

CROSS-REFERENCE TO RELATED APPLICATION

This application claims the priority benefit of China application serial no. 202210212731.7, filed on Mar. 4, 2022. The entirety of the above-mentioned patent application is hereby incorporated by reference herein and made a part of this specification.

BACKGROUND

Technical Field

The disclosure relates to an optical imaging lens.

Description of Related Art

The specifications of portable electronic devices are ever-changing, and the optical imaging lens, one of the key components, is further developing diversely. How to make the lens of the portable electronic device have various focal lengths and provide high pixel and high resolution under the limited system length is a challenge to be faced and a problem to be solved.

SUMMARY

The disclosure provides an optical imaging lens, which is provided with various focal lengths, good optical performance, and a small system length.

According to an embodiment of the disclosure, an optical imaging lens is provided. The optical imaging lens includes a first lens, a second lens, a third lens, a fourth lens, a fifth lens, and a sixth lens in sequence along an optical axis from an object side to an image side. The first lens to the fifth lens are aspheric surface lenses and have diopters, and the sixth lens is a metalens and has a positive diopter.

Based on the above, the optical imaging lens provided by the embodiment of the disclosure includes multiple lenses and a metalens. The metalens replaces the conventional multi-piece lenses with a binary pattern, greatly reducing the system length of the optical imaging lens. Moreover, the imaging lens is provided with various focal lengths and has good optical performance.

To make the above-mentioned features and advantages of the disclosure more comprehensible, several embodiments accompanied with drawings are described in detail as follows.

DESCRIPTION OF THE EMBODIMENTS

Figure 1A:
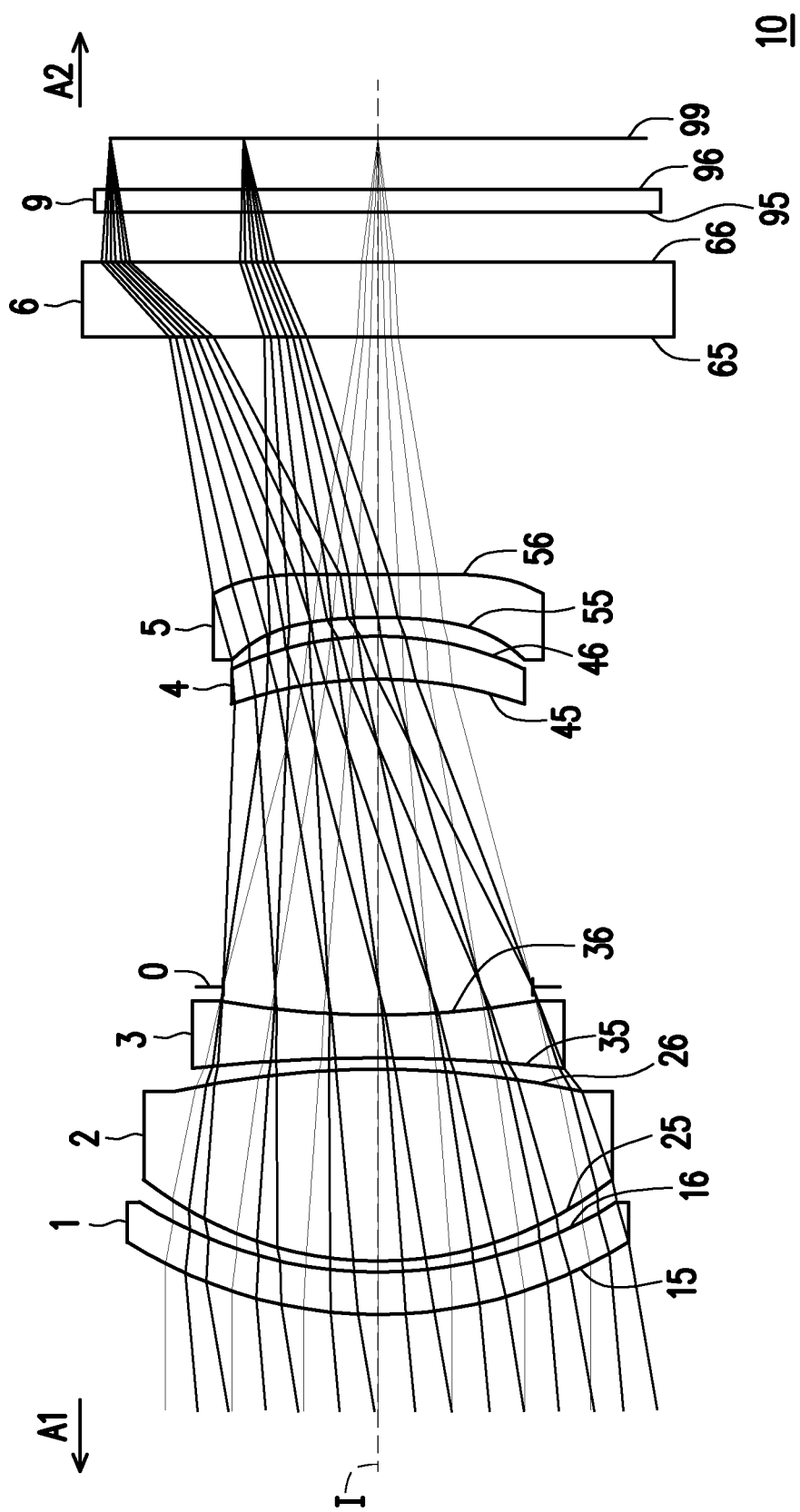
FIG. 1A is a schematic diagram of an optical imaging lens according to an embodiment of the disclosure.
Figure 1C:
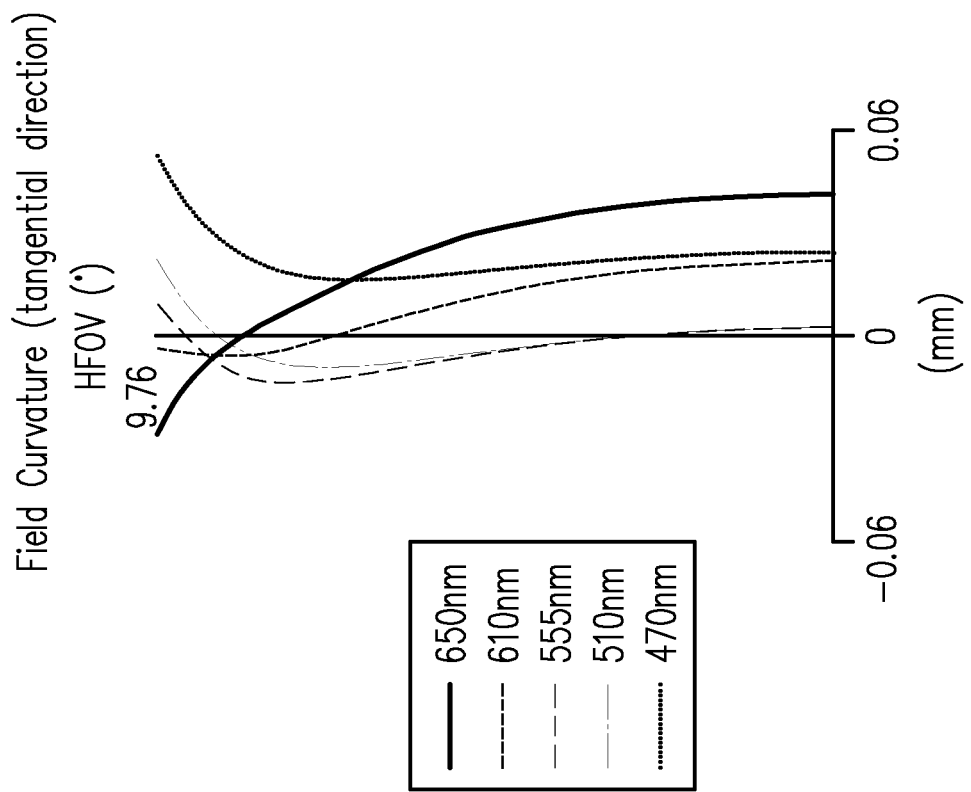
FIGS. 1B to 1D are aberration curves of the optical imaging lens shown in FIG. 1A.
Figure 1B:
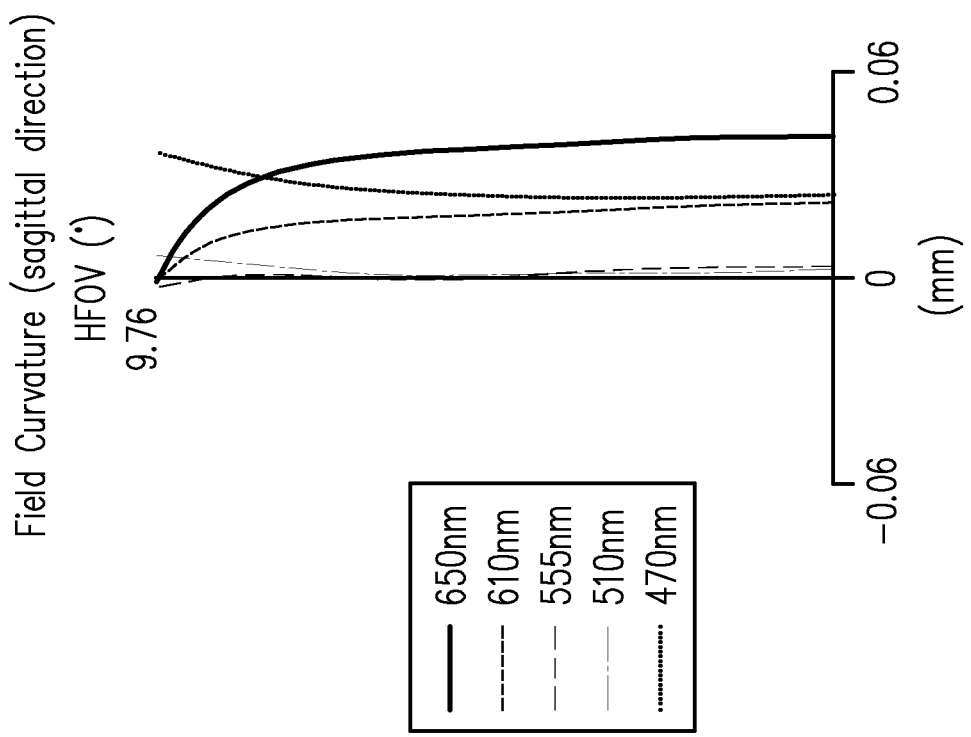
Figure 1D:
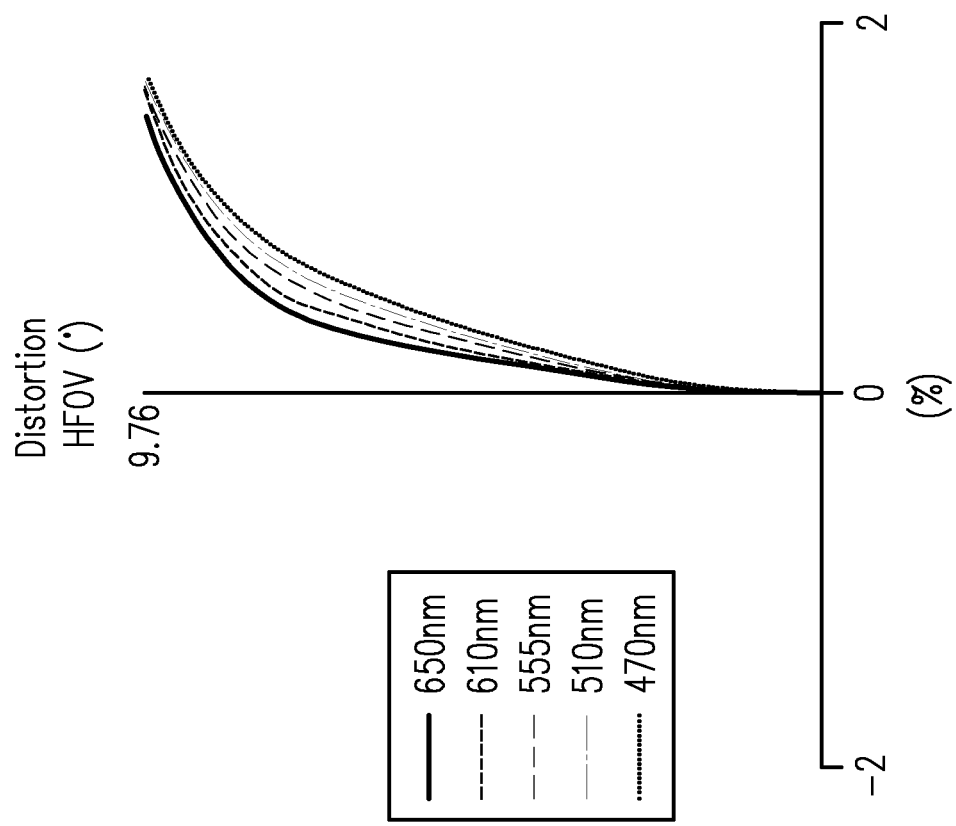

FIG. 1A is a schematic diagram of an optical imaging lens according to an embodiment of the disclosure, and FIGS. 1B to 1D are various aberration curves of the optical imaging lens. Referring to FIG. 1A first, an optical imaging lens 10 of the embodiment includes a first lens 1, a second lens 2, a third lens 3, an aperture 0, a fourth lens 4, a fifth lens 5, a sixth lens 6, and a filter 9 in sequence along an optical axis I of the optical imaging lens 10 from an object side A1 to an image side A2. When the light emitted by an object to be photographed enters the optical imaging lens 10, and transmits the first lens 1, the second lens 2, the third lens 3, the aperture 0, the fourth lens 4, the fifth lens 5, the sixth lens 6, and the filter 9 in sequence, an image is formed on an image plane 99. The first lens 1 to the fifth lens 5 are aspherical lenses and the diopters are negative, positive, negative, positive, and negative in sequence, and the sixth lens 6 is a metalens and has a positive diopter.

The filter 9 is, for example, an infrared cut-off filter, which may allow light with an appropriate wavelength (e.g., infrared or visible light) to pass through, and filter out the infrared wavelength band to be filtered. The filter 9 is disposed between the sixth lens 6 and the image plane 99. It shall be added that the object side A1 is a side facing the object to be photographed, and the image side A2 is a side facing the image plane 99.

In the embodiment, object side surfaces 15, 25, 35, 45, 55, 65, and 95 that face the object side A1 and allow imaging light to pass through, and image side surfaces 16, 26, 36, 46, 56, 66, and 96 that face the image side A2 and allow the imaging light to pass through are respectively provided on the first lens 1, the second lens 2, the third lens 3, the fourth lens 4, the fifth lens 5, the sixth lens 6, and the filter 9 of the optical imaging lens 10.

In the embodiment, the first lens 1 is a negative meniscus lens with a convex surface facing the object side A1, and both the object side surface 15 and the image side surface 16 of the first lens 1 are aspheric surfaces. The second lens 2 is a biconvex lens, and both the object side surface 25 and the image side surface 26 of the second lens 2 are aspheric surfaces. The third lens 3 is a biconcave lens, and both the object side surface 35 and the image side surface 36 of the third lens 3 are aspheric surfaces. The fourth lens 4 is a positive meniscus lens with a convex surface facing the image side A2, and both the object side surface 45 and the image side surface 46 of the fourth lens 4 are aspheric surfaces. The fifth lens 5 is a biconcave lens, and both the object side surface 55 and the image side surface 56 of the fifth lens 5 are aspheric surfaces.

Regarding the metalens used as the sixth lens 6 (hereinafter referred to as the metalens 6), please refer to FIGS. 1A, 2, 3, and 4 at the same time, which show plan views (FIGS. 2 and 3) or a cross-sectional view (FIG. 4) of the metalens of embodiments of the disclosure, respectively. The metalens 6 includes a substrate 601 and multiple microstructures 602 disposed on the substrate 601. The microstructures 602 are disposed on a first surface 601T of the substrate 601. A second surface 601D of the substrate 601 is the image side surface 66 of the metalens 6, and top surfaces 602T of the microstructures 602 constitute the object side surface 65 of the metalens 6. The metalens 6 further includes a center of symmetry C, and the microstructures 602 are disposed in a circularly symmetrical manner with respect to the center of symmetry C. The optical axis I passes through the center of symmetry C and is parallel to the normal of the substrate 601. The metalens 6 replaces the conventional multi-piece lenses with the binary pattern formed by the above-mentioned microstructures 602 to provide the required phase retardation, and the system length of the optical imaging lens 10 is greatly reduced.

Figure 2:
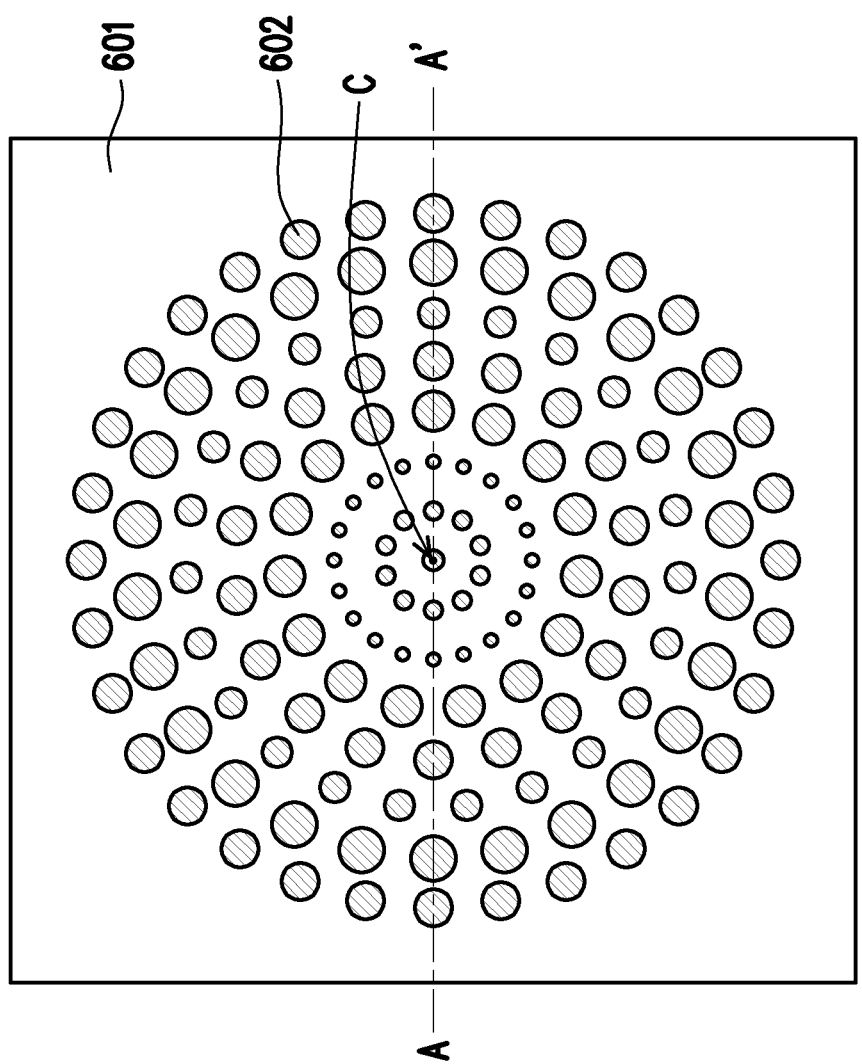
FIG. 2 is a plan view of a metalens according to an embodiment of the disclosure.
Figure 4:
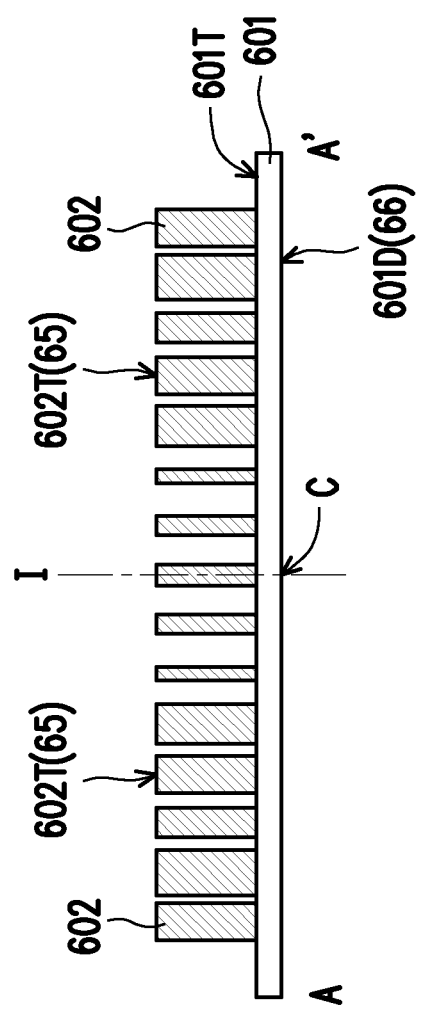
FIG. 4 is a cross-sectional view of a metalens according to an embodiment of the disclosure.

In an embodiment of the disclosure, referring to FIGS. 2 and 4, each of the microstructures 602 is a cylinder, and FIG. 4 may be regarded as a cross-sectional view along a line AA' of FIG. 2. The microstructures 602 may have different widths in the direction perpendicular to the optical axis I as shown in FIGS. 2 and 4.

Figure 3:
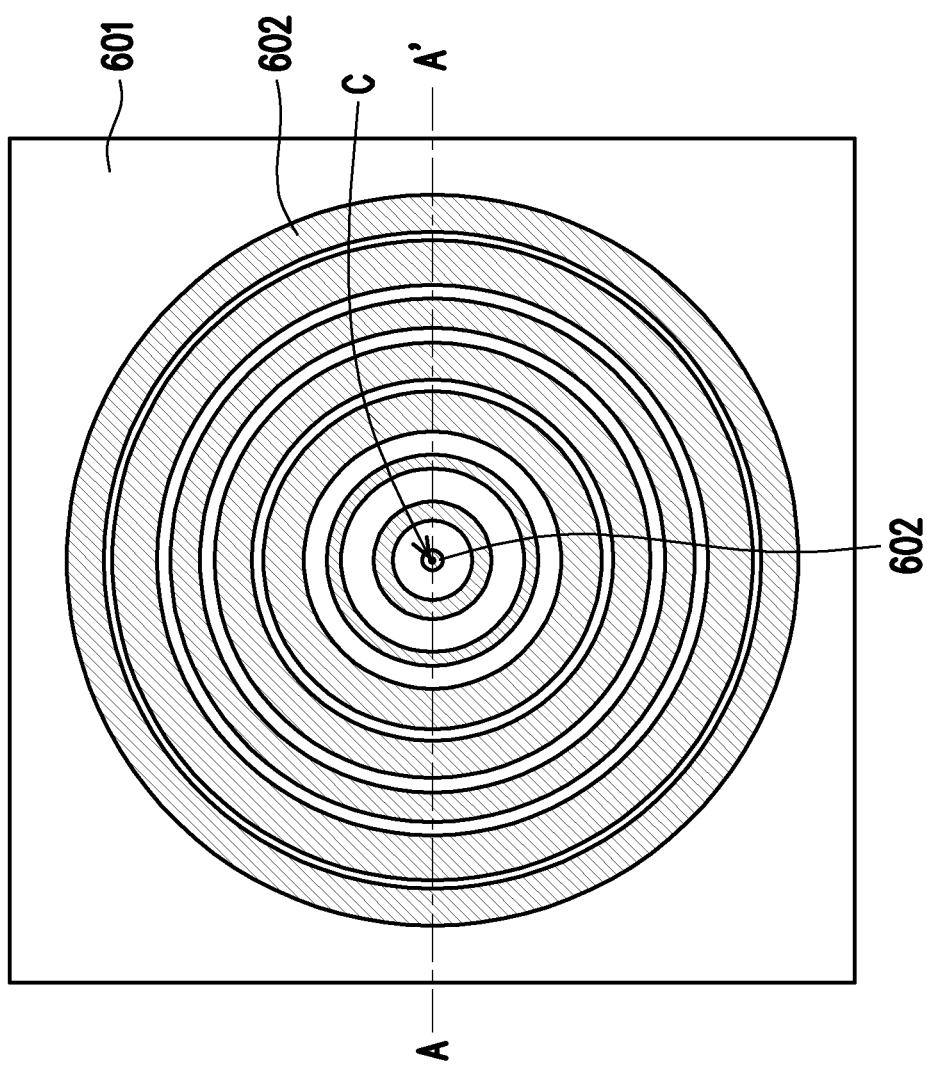
FIG. 3 is a plan view of a metalens according to an embodiment of the disclosure.

In another embodiment of the disclosure, referring to FIGS. 3 and 4, multiple annular microstructures 602 and cylindrical microstructures 602 disposed at the center of symmetry C are disposed on the substrate 601. The annular microstructures 602 are configured in a circularly symmetrical manner with respect to the center of symmetry C, and the center of symmetry C overlaps with the optical axis I. FIG. 4 may be viewed as a cross-sectional view along the line AA' of FIG. 3. The microstructures 602 may have different widths in the direction perpendicular to the optical axis I as shown in FIGS. 3 and 4.

In the embodiment shown in FIGS. 2 to 4, the width of the annular microstructure 602 or the cylindrical microstructure 602 in the direction perpendicular to the optical axis I may fall within the range of 50 nm to 230 nm. The height in a direction parallel to the optical axis I may fall within the range of 550 nm to 650 nm, which is 600 nm in an embodiment. The distance between the center of one cylindrical microstructure 602 and the center of another adjacent cylindrical microstructure 602 may fall within the range of 230 nm to 270 nm, which is 250 nm in an embodiment. In some embodiments, the distance between the center of one cylindrical microstructure 602 and the center of another adjacent cylindrical microstructure 602 may be less than or equal to 0.75λ, where λ is the wavelength of visible light. In some embodiments, the ratio of the height of the annular microstructure 602 or the cylindrical microstructure 602 in the direction parallel to the optical axis I to the width in the direction perpendicular to the optical axis I is greater than 2.5 and less than 12. In some embodiments, the annular microstructure 602 or the cylindrical microstructure 602 has a refractive index n, and n falls within the range of 2.4 to 2.7.

Other detailed optical data of the embodiment are shown in Table 1. The overall effective focal length (EFL) of the optical imaging lens 10 is 14.46 millimeter (mm), the half field of view (HFOV) is 9.76°, the system length (TTL) is 11 mm, the aperture value (F-number) is 3.40, and the image height is 2.5 mm. The TTL refers to the distance from the object side surface 15 of the first lens 1 to the image plane 99 on the optical axis I.

TABLE 1

Optical Imaging Lens 10
EFL = 14.46 mm, HFOV = 9.76°, F-number = 3.40,
Image height = 2.5 mm, TTL = 11 mm

| Element | Surface | Radius of curvature (mm) | Distance (mm) | Refractive index | Abbe number |
|---|---|---|---|---|---|
| Object | | infinity | infinity | | |
| First lens 1 | Object side surface 15 | 4.391 | 0.400 | 1.671 | 19.276 |
| | Image side surface 16 | 4.227 | 0.100 | | |
| Second lens 2 | Object side surface 25 | 3.293 | 1.804 | 1.545 | 55.987 |
| | Image side surface 26 | −8.110 | 0.100 | | |
| Third lens 3 | Object side surface 35 | −12.571 | 0.400 | 1.671 | 19.276 |
| | Image side surface 36 | 8.392 | 0.262 | | |
| Aperture 0 | | infinity | 2.877 | | |
| Fourth lens 4 | Object side surface 45 | −4.781 | 0.400 | 1.545 | 55.987 |
| | Image side surface 46 | −3.508 | 0.182 | | |
| Fifth lens 5 | Object side surface 55 | −4.405 | 0.400 | 1.671 | 19.276 |
| | Image side surface 56 | 72.410 | 2.211 | | |
| Sixth lens 6 | Object side surface 65 | infinity | 0.700 | 1.458 | 67.796 |
| | Image side surface 66 | infinity | 0.477 | | |
| Filter 9 | Object side surface 95 | infinity | 0.210 | 1.517 | 64.167 |
| | Image side surface 96 | infinity | 0.477 | | |
| Image plane 99 | | infinity | — | | |

The radius of curvature of the object side surface 15 shown in Table 1 refers to the radius of curvature of the object side surface 15 of the first lens 1 in the optical axis region, and the radius of curvature of the image side surface 16 refers to the image side surface 16 of the first lens 1 in the optical axis region, and so on. The distance of the object side surface 15 (0.400 mm as shown in Table 1) refers to the distance between the object side surface 15 and the next surface (the image side surface 16 in the example) on the optical axis I, that is, the thickness of the first lens 1 is on the optical axis I is 0.400 mm, and the distance of the image side surface 16 (0.100 mm as shown in Table 1) refers to the distance between the image side surface 16 and the object side surface 25 on the optical axis I, that is, the distance between the first lens 1 and the second lens 2 on the optical axis I is 0.100 mm, and so on.

According to Table 1, the object side surface 15 of the first lens 1 is a convex surface and the image side surface 16 is a concave surface, the object side surface 25 of the second lens 2 is a convex surface and the image side surface 26 is convex surface, and the object side surface of the third lens 3 is a concave surface and the image side surface 36 is a concave surface, the object side surface 45 of the fourth lens 4 is a concave surface and the image side surface 46 is a convex surface, and the object side surface 55 of the fifth lens 5 is a concave surface and the image side surface 56 is a concave surface. The refractive indices of the first lens 1 to the fifth lens 5 fall within the range of 1.5 to 1.7, and the refractive index of the substrate 601 of the sixth lens 6 falls within the range of 1.4 to 1.5, which is 1.458 in the embodiment.

In some embodiments of the disclosure, the optical imaging lens satisfies the conditional expression of TTL/EFL<0.8, where TTL is the distance from the object side surface of the first lens 1 to the image plane 99 on the optical axis I, and EFL is the effective focal length of the optical imaging lens. In some embodiments of the disclosure, the optical imaging lens satisfies the conditional expression of 0.5×TTL<D1<0.75×TTL, where D1 is the distance between the aperture 0 and the sixth lens 6 on the optical axis I.

In the embodiment, the object side surfaces 15, 25, 35, 45, and 55 and the image side surfaces 16, 26, 36, 46, and 56 of the first lens 1 to the fifth lens 5 total ten surfaces and are all aspheric surfaces. These aspheric surfaces are defined according to the following formula (1):

$$Z(Y) = \frac{Y^2}{R} / \left(1 + \sqrt{1-(1+K)\frac{Y^2}{R^2}}\right) + \sum_{i=1}^{n} a_{2i} \times Y^{2i} \quad (1)$$

Y: the distance between a point on the aspheric curve and the optical axis I;

Z: the depth of the aspheric surface, that is, the vertical distance between the point on the aspheric surface that is Y from the optical axis I, and the tangent plane tangent to the vertex of the aspheric surface on the optical axis;

R: the radius of curvature of the lens surface;

K: cone coefficient;

$a_{2i}$: the 2i tier aspheric coefficient.

The aspheric coefficients of the above-mentioned aspheric surfaces in formula (1) are shown in Table 2 below. Among them, the column number 15 in Table 2 represents the aspheric coefficient of the object side surface 15 of the first lens 1, the column number 16 represents the aspheric coefficient of the image side surface 16 of the first lens 1, and the other columns follow the same analogy.

TABLE 2

| Surface | K | $a_4$ | $a_6$ | $a_8$ | $a_{10}$ |
|---|---|---|---|---|---|
| 15 | 0 | 1.29E−03 | −3.86E−05 | 1.44E−06 | −6.17E−06 |
| 16 | 0 | 2.13E−03 | 1.17E−04 | −2.39E−05 | −8.72E−06 |
| 25 | 0 | −1.18E−03 | −7.56E−05 | −3.36E−05 | −5.45E−06 |
| 26 | 0 | 1.56E−03 | −9.25E−06 | −3.35E−05 | 4.00E−06 |
| 35 | 0 | 1.72E−03 | 2.31E−04 | −2.29E−05 | 3.75E−06 |
| 36 | 0 | −7.96E−04 | 2.29E−05 | 1.06E−05 | −9.03E−06 |
| 45 | 0 | −1.44E−02 | −2.17E−03 | −2.46E−04 | 9.30E−04 |
| 46 | 0 | 4.60E−03 | −6.83E−03 | −1.67E−03 | 7.45E−04 |
| 55 | 0 | −3.08E−02 | −7.17E−03 | −1.45E−03 | −1.20E−03 |
| 56 | 0 | −3.48E−02 | 2.08E−03 | −1.49E−03 | 1.47E−04 |

The binary coefficients of the object side surface 65 and the image side surface 66 of the metalens 6 (the sixth lens 6) are shown in Table 3.

TABLE 3

| Surface | $p^2$ | $p^4$ | $p^6$ | $p^8$ |
|---|---|---|---|---|
| 65 | 5.74E+04 | −1.37E+04 | 1.51E+04 | 4.68E+05 |
| 66 | −4.97E+04 | −8.82E+03 | −1.94E+04 | 4.95E+03 |

Referring to FIGS. 1B to 1D, FIGS. 1B and 1C illustrate the field curvature aberration in the sagittal direction and the field curvature aberration in the tangential direction on the image plane 99 when the light wavelengths are 650 nm, 610 nm, 555 nm, 510 nm, and 470 nm, respectively. FIG. 1D illustrates the distortion aberration on the image plane 99 when the light wavelengths are 650 nm, 610 nm, 555 nm, 510 nm, and 470 nm.

In the two field curvature aberration diagrams in FIGS. 1B and 1C, the field curvature aberrations of the above five representative wavelengths in the entire field of view are within ±0.06 mm, indicating that the optical system of the embodiment can effectively eliminate the aberrations. The distortion aberration diagram in FIG. 1D shows that the distortion aberration of the embodiment is maintained within the range of ±2%, which indicates that the distortion aberration of the embodiment meets the imaging quality requirements of the optical system. Therefore, compared with the existing optical lens, the embodiment can still provide good imaging quality under the condition that the aperture value is 3.40 and the image height is 2.5 mm, and the system length is only 11 mm.

In summary, the optical imaging lens provided by the embodiments of the disclosure includes multiple lenses and a metalens. The metalens replaces the conventional multi-piece lenses with the binary pattern, greatly reducing the system length of the optical imaging lens. Moreover, the imaging lens is provided with various focal lengths and has good optical performance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the claims appended hereto and their equivalents.

What is claimed is:

1. An optical imaging lens, comprising a first lens, a second lens, a third lens, a fourth lens, a fifth lens, and a sixth lens in sequence along an optical axis from an object side to an image side, wherein the first lens, the second lens, the third lens, the fourth lens, the fifth lens and the sixth lens respectively have a negative diopter, a positive diopter, a negative diopter, a positive diopter, a negative diopter and a positive diopter; the optical imaging lens has a total of six lenses; the first lens to the fifth lens are aspheric surface lenses, and the sixth lens is a metalens,
wherein the optical imaging lens satisfies a conditional expression of TTL/EFL<0.8, where TTL is a distance from an object side surface of the first lens to an image plane on the optical axis, and EFL is an effective focal length of the optical imaging lens.

2. The optical imaging lens according to claim 1, further comprising an aperture, disposed between the third lens and the fourth lens.

3. The optical imaging lens according to claim 2, wherein the optical imaging lens satisfies a conditional expression of 0.5×TTL<D1<0.75×TTL, where D1 is a distance between the aperture and the sixth lens 6 on the optical axis.

4. The optical imaging lens according to claim 1, wherein the sixth lens comprises a substrate and a plurality of microstructures disposed on the substrate, and the plurality of microstructures are configured in a circularly symmetrical manner with respect to the optical axis.

5. The optical imaging lens according to claim 4, wherein each of the microstructures is provided with a width W1 in a direction perpendicular to the optical axis and a width W2 in a direction parallel to the optical axis, and satisfies a conditional expression of 2.5<W2/W1<12.

6. The optical imaging lens according to claim 5, wherein the width W1 falls within a range of 50 nm to 230 nm.

7. The optical imaging lens according to claim 4, wherein the optical imaging lens satisfies a conditional expression of D2≤0.75λ, where D2 is a distance between the microstructures adjacent to each other, and λ is a wavelength of visible light.

8. The optical imaging lens according to claim 4, wherein the plurality of microstructures comprises a plurality of rings, and centers of symmetry of the plurality of rings overlap with the optical axis.

9. The optical imaging lens according to claim 4, wherein the plurality of microstructures are disposed on the substrate in an array, and each of the microstructures is a cylinder.

10. The optical imaging lens according to claim 4, wherein the plurality of microstructures have refractive indices n, and n fall within a range of 2.4 to 2.7.

11. The optical imaging lens according to claim 1, wherein the first lens is a negative meniscus lens with a convex surface facing the object side.

12. The optical imaging lens according to claim 1, wherein the fourth lens is a positive meniscus lens with a convex surface facing the image side.

13. The optical imaging lens according to claim 1, wherein the second lens is a biconvex lens.

14. The optical imaging lens according to claim 1, wherein the third lens and the fifth lens are biconcave lenses.

* * * * *